Jan. 17, 1939.  A. BUCHI  2,144,561
FOUR STROKE CYCLE INTERNAL COMBUSTION ENGINE
Filed Jan. 29, 1936   5 Sheets-Sheet 1
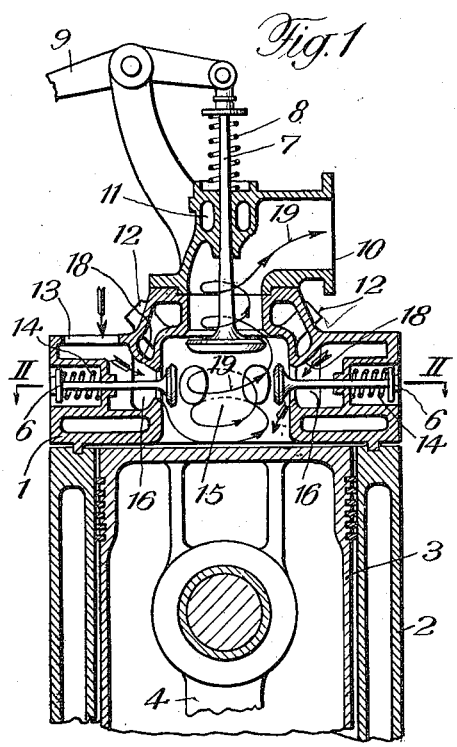
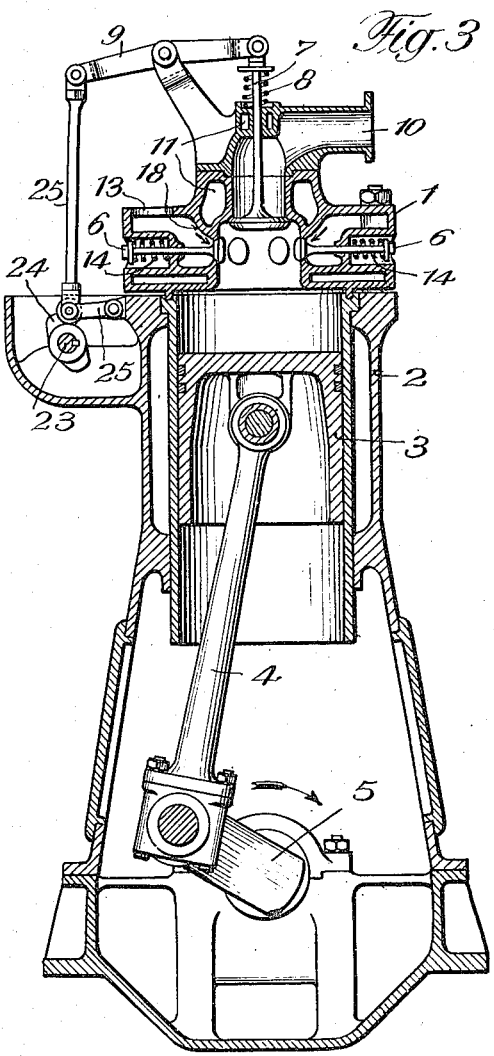
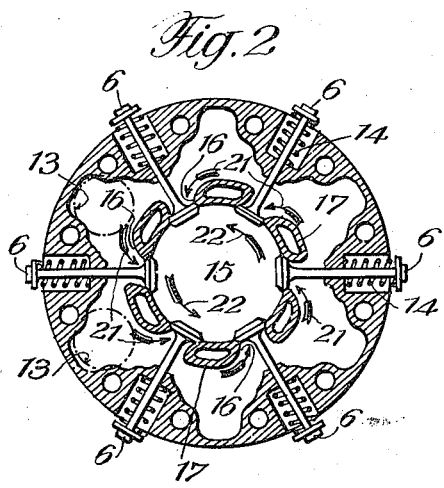
Inventor:
Alfred Büchi
By Sommers & Young
Attys.

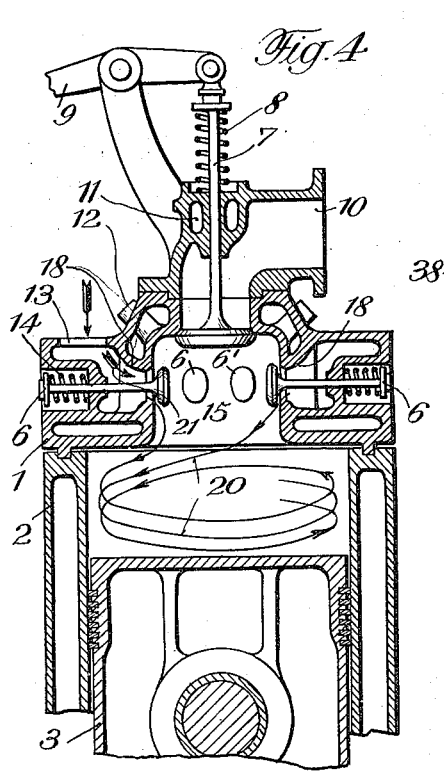

Jan. 17, 1939.  A. BUCHI  2,144,561
FOUR STROKE CYCLE INTERNAL COMBUSTION ENGINE
Filed Jan. 29, 1936  5 Sheets-Sheet 3

Inventor:
Alfred Büchi
By Sommers + Young
Attys.

Jan. 17, 1939. A. BUCHI 2,144,561
FOUR STROKE CYCLE INTERNAL COMBUSTION ENGINE
Filed Jan. 29, 1936 5 Sheets-Sheet 4

Inventor:
Alfred Büchi
By Sommers & Young
Attys.

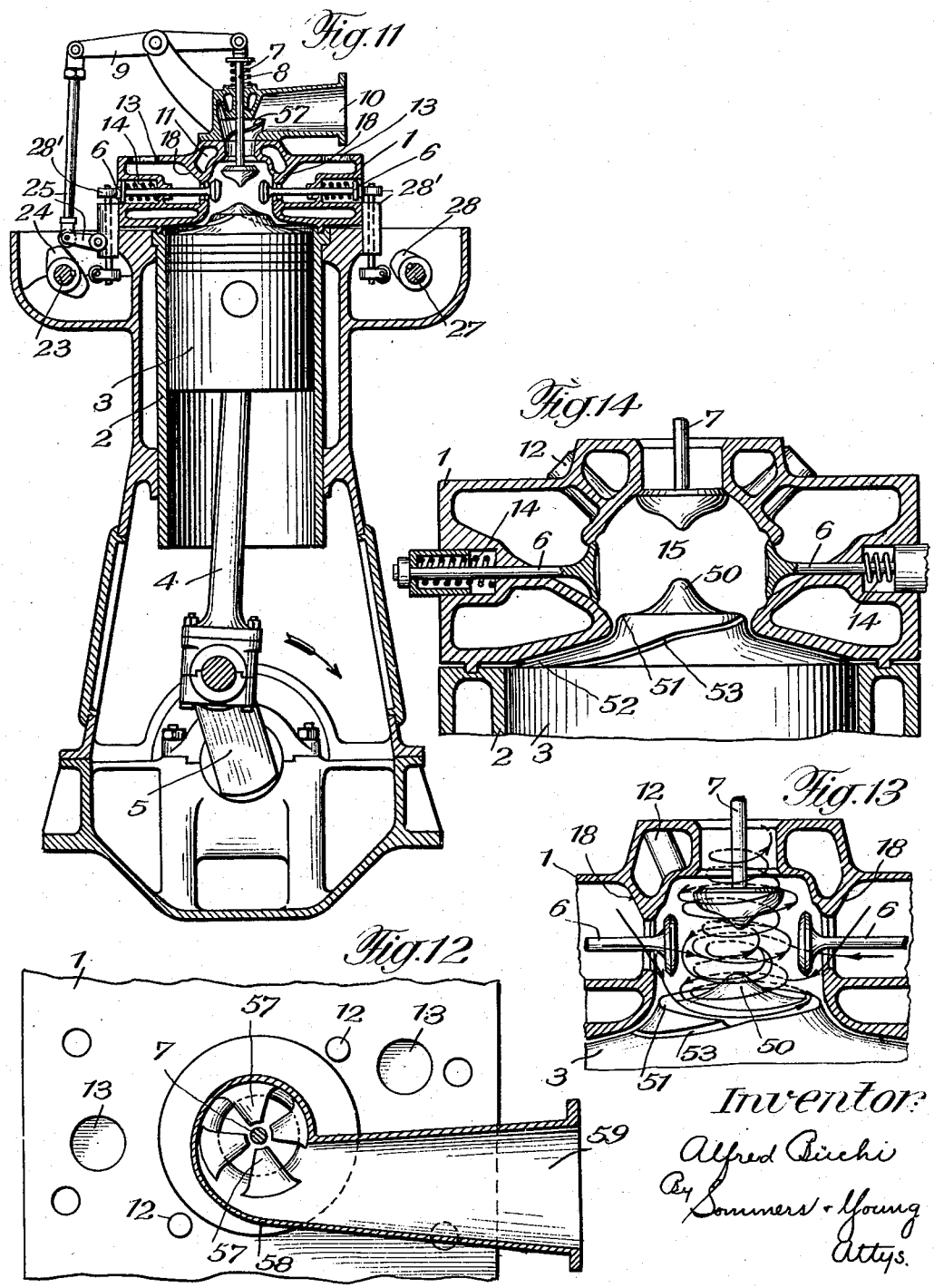

Patented Jan. 17, 1939

2,144,561

UNITED STATES PATENT OFFICE 2,144,561

FOUR STROKE CYCLE INTERNAL COMBUSTION ENGINE

Alfred Buchi, Winterthur, Switzerland

Application January 29, 1936, Serial No. 61,419
In Switzerland February 4, 1935

9 Claims. (Cl. 123—76)

This invention relates to four stroke cycle internal combustion engines to which the fuel is admitted under pressure, and each of the working cylinders of which is provided with a combustion chamber which is situated in prolongation of the axis of the cylinder and the diameter of which is smaller than the diameter of the cylinder.

The invention consists in the arrangement of a plurality of inlet members spaced apart circumferentially of the combustion chamber and such a construction of the inlet passages that the entering charge is moved towards the working piston in a direction tangentially of the combustion chamber. In this construction the outlet members of each combustion chamber are disposed at the ends of the combustion chambers remote from the piston.

In the accompanying drawings several embodiments of the invention are illustrated by showing particularly the parts thereof that are necessary for a clear understanding of the invention. Obviously still other constructions may be devised for carrying out the invention.

In the drawings like or corresponding parts are designated by the same reference numerals.

Figures 1 to 3 show an embodiment of the invention in which the piston face is flat and the outer wall of the constricted combustion chamber is cylindrical. Six intake valves are disposed in uniform distribution in the cylindrical outer wall of the combustion chamber. The direction of the charge entering the chamber is made tangential to the cylinder axis and to the piston by suitable tangential and downward direction and form of the passages carrying the air to the intake valves.

Fig. 1 is a vertical section through the combustion chamber of the first embodiment of the internal combustion engine according to the invention;

Fig. 2 is a horizontal section on the line II—II in Fig. 1 but with the intake valves in closed position;

Fig. 3 is a vertical section similar to Fig. 1, but extending completely through the engine the intake and exhaust valves being closed;

Fig. 4 is a further vertical section through the combustion chamber of the cylinder of an embodiment of the invention according to Fig. 1, but with the pitson in different position and with the exhaust valve closed;

Fig. 5 shows a horizontal section through the combustion chamber of a cylinder of a second embodiment of the invention in the form of a three-cylinder internal combustion engine. The position of this horizontal section is similar to that of Fig. 2.

Fig. 7 shows an elevation of the end of Fig. 6 at which the valve drive gear is positioned;

Fig. 8 is a horizontal section, similar to Fig. 5, of a modified arrangement of the inlet valves which vary in number as well as in regard to their relative arrangement;

Figures 9–13 show particularly a construction of the piston extension closing off the constricted combustion chamber. It is formed so that air currents contacting therewith in downwardly directed helical lines are diverted without loss through the center of the combustion chamber again to the exhaust valve. It is also shown there that this piston extension can also be provided with grooves so that the air forced out at the periphery of the piston in the compression supports the rotary movement in the combustion chamber.

Figures 9, 11, 13 and 14 also show how the part of the exhaust valve extending into the combustion chamber is formed in order to pass the charge moving at the center of the combustion chamber away from the piston, to the exhaust valve opening.

Figure 9:
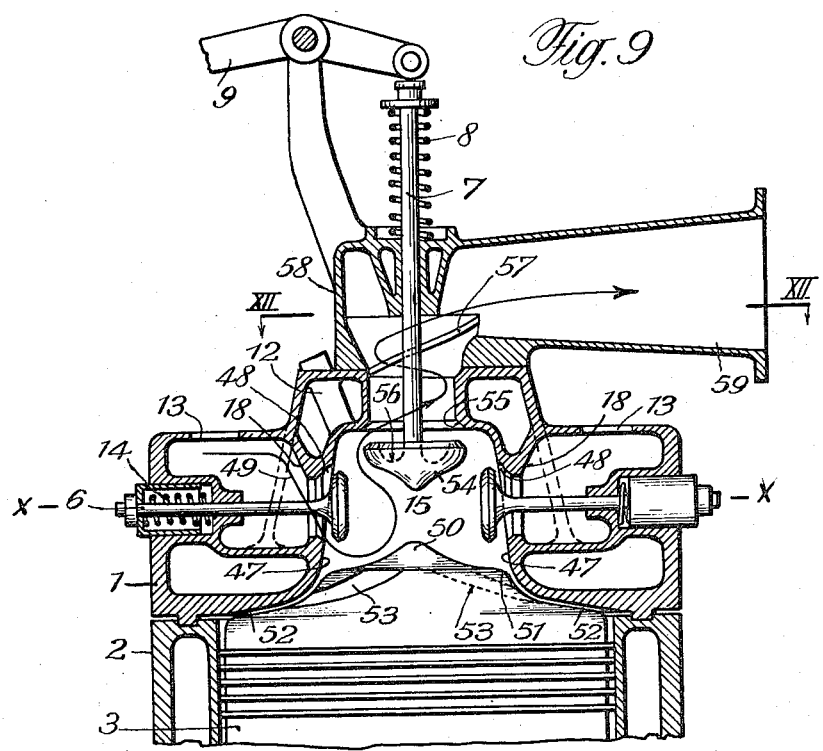
Figure 10:
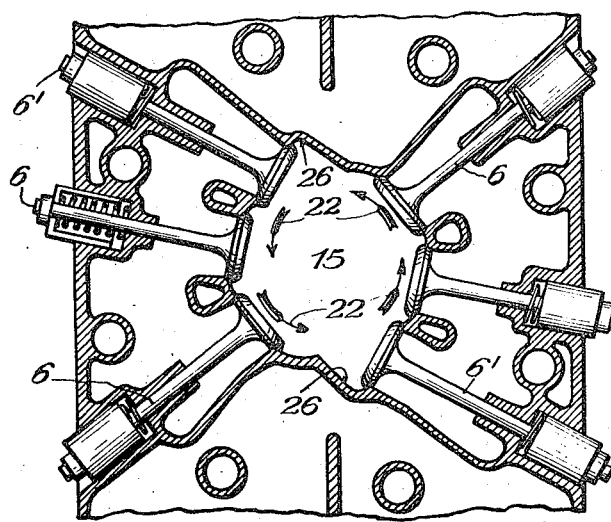

Fig. 9 shows a vertical section of the combustion chamber of a cylinder of a fourth embodiment of the internal combustion engine according to the invention, the section being taken through the axis of the cylinder;

Fig. 10 shows a horizontal section on the line X—X in Fig. 9;

Fig. 11 shows a vertical section similar to Fig. 9, but including the crank drive;

Fig. 12 shows a horizontal section on the line XII—XII in Fig. 9 through the exhaust socket thereof;

Fig. 13 illustrates the path of circulation of air and gas respectively through a construction as shown in the Figs. 9 to 11;

Fig. 14 shows a vertical section through a combustion chamber similar to that of Fig. 13 but of substantially spherical shape.

In the embodiment of the invention illustrated in Figs. 1 to 4 the piston face is flat and the outer wall of the constricted combustion chamber is cylindrical. Six intake valves are disposed in uniform distribution in the cylindrical outer wall of the combustion chamber. The direction of the charge entering the chamber is made tangential to the cylinder axis and to the piston by suitable tangential and downward direction and form of the passages carrying the air to the intake valves.

Numeral 1 designates a cylinder head of a working cylinder 2 of an internal combustion engine according to the invention. The working piston 3 is operatively connected with a piston rod 4 and the crankshaft 5 of the engine, in conventional manner. The reference numeral 6 indicates the inlet valves and 7 the outlet valve, whereas 9 denotes the control tappet of the outlet valve. The exhaust gases pass out of the cylinder head 1 through a casing 10 in which the valve 7 is guided. The valve guiding portion of this casing may be cooled by means of a cooling space 11, as shown. By 12 thickenings for the fuel valves are designated through which the fuel is introduced into the combustion chamber, while the apertures for introducing the fresh air charge are referred to by 13.

In the Figs. 1 to 4, it will be seen that as inlet members six automatically operating valves 6 are provided which are maintained pressed on their seats by springs 14. The novel construction as disclosed by these figures is such that the six inlet valves are distributed around the circumference of the cylindrical combustion chamber 15 in spaced radial disposition. The entrance passages 16 to the seat openings of these valves are so shaped that the charge enters in the combustion chambers counterclockwise, as indicated by the arrows 21 in Fig. 2, thereby forming eddies. This direction of entering is obtained by correspondingly shaping the cooled ribs 17.

The movement of flow of the charge which, according to the invention, is directed also towards the piston is obtained by directing the portions 18 of the walls of the entrance passages 16 downwardly. It will be readily seen that, in this way, at the exterior circumference of the combustion chamber, a flow of charge is provided which is directed tangentially of the combustion chamber as well as downwardly and which then impinges on the upper end of the piston before passing upwardly towards the outlet valve, through a central zone about the axis of the cylinder, as long as this valve is open. When internal combustion engines are involved which are scavenged the inlet and outlet valves are maintained open simultaneously, that is, in cases where the charge is precompressed.

Fig. 1 shows the relative positions of the inlet and outlet valves during the scavenging period. The path through which the admitted and discharged scavenging air and exhaust gases travel is indicated by the thin spiral line 19. In Fig. 2 the inlet valves are shown to be closed as occurs during the compression or expansion stroke of a four stroke cycle internal combustion engine. In Fig. 3 also the control gear of the outlet valve is shown. This control is effected from the cam shaft 23 carrying cams 24. The lifts of these cams are transmitted to the tappets 9 of the outlet valves by means of linkages 25.

In Fig. 4, the inlet valves are shown to be opened as occurs during the suction stroke. Accordingly, the piston is shown in a lower position. In this case a spiral flow extending downwardly adjacent to the piston end is created in the entering charge. The spiral path of movement of the entering charge is indicated by the thin line 20. The arrows 21 indicate the direction in which the charge approaches the inlet valves from behind, whereas the arrows 22 indicate the spiral movement of flow of the charge inside the combustion chamber.

Fig. 5 shows the use of mechanically operated inlet valves, while in the Figs. 1 to 4 automatically operating inlet valves are shown to be provided. In Figure 5 six inlet valves are distributed about the combustion chamber. Four of these valves 6 are radially disposed relative to the axis of the combustion chamber and two of these valves, which are designated by 6', have their axes directed so as to pass by the centre of the combustion chamber on opposite sides. This arrangement serves the purpose of imparting to the charge having entered the combustion chamber a counterclockwise rotational movement of flow inside this chamber. This effect is obtained by means of the walls 26 of the combustion chamber being set back close up to one side of the inlet members.

By means of this rotational movement of flow of the admitted charge, the portions of the charge entering through the valves 6 are also imparted such a rotational movement inside the combustion chamber. The tendency of this movement to shift downwardly is obtained by means of downwardly directed walls 18, in a similar manner as described in connection with Figs. 1 to 4, these walls not being shown in Fig. 5. The control of the inlet valves is effected by means of two cam shafts 23 and 27 which are arranged on opposite sides of the cylinder head 1. Numeral 28 denotes two inlet cams, and numeral 28' designates guide rollers provided with control levers which cooperate on the one hand with the cams 28 and on the other with the valves 6 and 6' respectively. The inlet valves 6 and 6' are pressed against their seats by springs 14.

Figure 6:
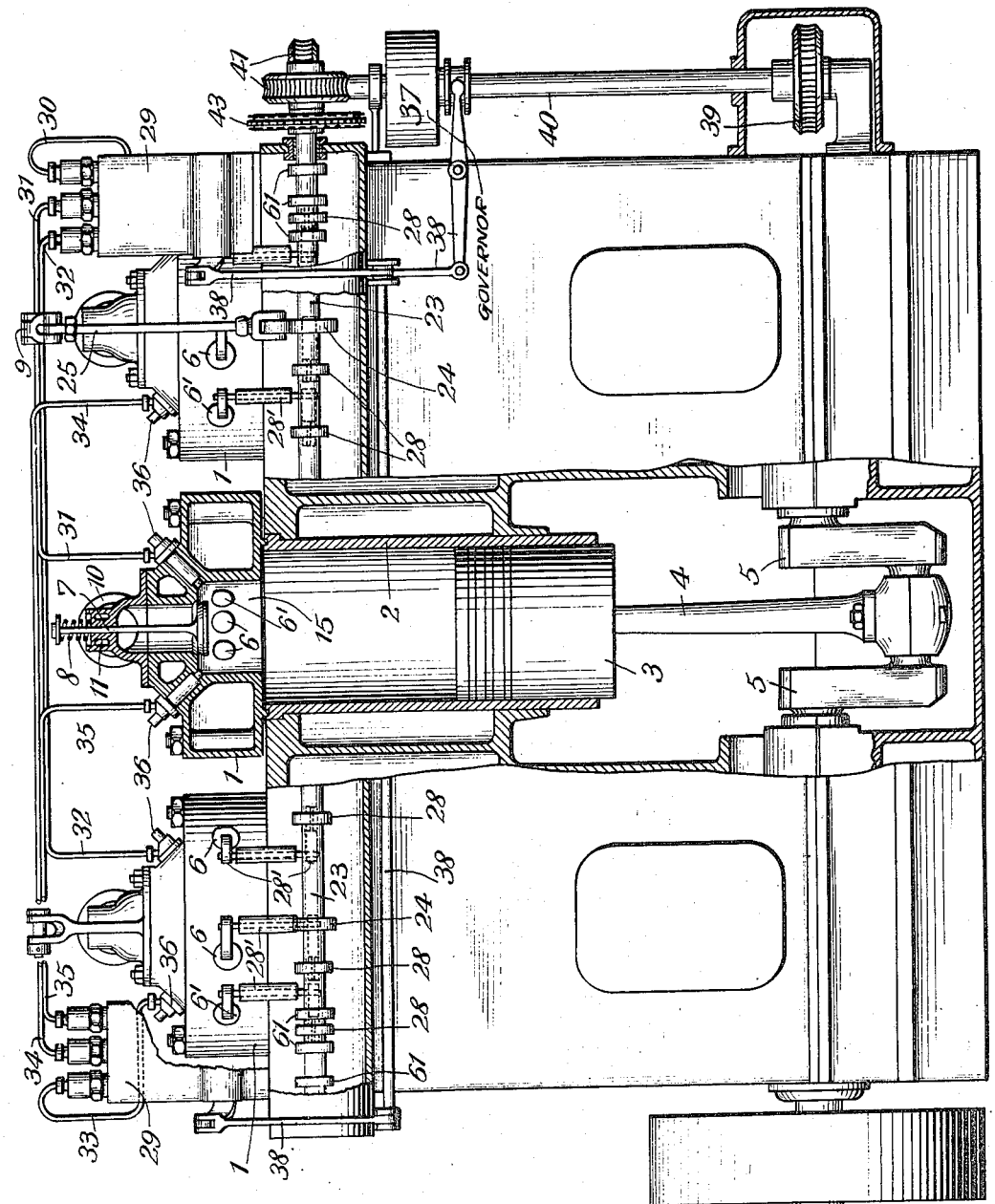
Fig. 6 is a longitudinal elevational view of the second embodiment of the internal combustion engine with the central part broken away showing the middle cylinder and combustion chamber inclusive of the cooperating portion of the crankshaft in a sectional view.

Fig. 6 shows an elevation, partly in section, through one of the working cylinders of the second embodiment of the invention. This figure shows the front cam shaft 23 with the cams 24 for the outlet valves 7 and the cams 28 for the inlet valves 6 and 6' respectively. This figure includes also fuel pumps 29 from which fuel branch conduits 30, 31, 32 and 33, 34, 35 respectively are passed to the fuel valves 36. In addition a governor 37 is shown for regulating the fuel pumps by means of linkages 38.

Fig. 7 shows an end view of Fig. 6 as seen from the end on which the valve driving gear is arranged. This figure shows the drive for both cam shafts 23 and 27, the driving movement being transmitted from the crankshaft 5 through the intermediary of worm wheels 39, a vertical shaft 40 and a further worm wheel 41. From the cam shaft 23 driving movement is imparted to the cam shaft 27 by means of a driving chain 42 and chain wheels 43, 44.

Fig. 7 further shows a conduit 45, through which the charging air is supplied to the internal combustion engine, as well as a conduit 46 through which the exhaust gases are discharged.

Fig. 8 shows a horizontal section through a combustion chamber having only four inlet valves 6'. All these valves are so arranged that their axes pass by the centre of the combustion chamber. The arrangement is such that also in this case, by means of the four offset portions 26 formed in the wall of the combustion chamber, a rotational movement of flow in one and the same direction is obtained inside the chamber, as indicated by the arrows 22. In this arrangement automatic inlet valves are used, but it is obvious that also valves may be provided which cooperate with a control gear.

In Figs. 9 and 10 an embodiment of the invention is shown in which the tendency of the entering air to flow downwardly as well as rotationally is produced with the aid of a special construction of the inner wall surface of the combustion chamber. The tendency to move downwardly towards the working piston is imparted to the charge by means of an upper inwardly inclined wall portion 47 of the combustion chamber 15. In this arrangement the six inlet valves 6 and 6' extend perpendicularly to the axis of the cylinder, in which way in the conically upwardly tapering wall 47 of the combustion chamber above the valve seats notches 48 are formed.

On leaving the inlet valves, the charge is prevented from escaping upwardly by notches 48, so that the main part of the entering air flows downwardly, as indicated by the arrow 49. Due to the fact that the outlet valve 7 is situated close by the inlet valves 6 and 6' the passage of any substantial portion of the entering air straight over to the valve seat of the outlet valve is prevented, as, if this should occur this air would thus be of no use for scavenging the cylinder. The rotational movement of flow inside the combustion chamber, as indicated by the arrows 22, is effected by means of the eccentric arrangement of the inlet valves, 6' in that these valves are positioned close by the set back wall 26, so that the bulk of the entering air is caused to flow counterclockwise into the cylinder, as indicated by the arrows 22 in Fig. 10. The seats of the valves 6' are raised relative to the seats of the immediately adjacent inlet valves 6, so that the portions of the air entering through two of these valves respectively do not interfere with one another. The inlet valves 6 radially directed and are thus operated to direct the bulk of air entering therethrough to flow downwardly by cooperation of these valves with the corresponding notches 48.

Fig. 9 further shows an alternative form of the upper portion of the piston for carrying the invention into effect in an improved manner. The upper portion 50 of the piston 53 is so shaped that it is adapted to assist the downwardly flowing charge and the gases to change their direction of flow from the outside inwardly and also upwardly. In addition the piston is provided with a projection 51 for extending into the combustion chamber. Thus, when this projection extends into the combustion chamber during the end portions of the compression stroke and the exhaust stroke, the portion of the charge or the exhaust gas respectively overlying the portion 52 of the piston is forced upwardly at great velocity through the narrow gap formed between the projection 51 and the wall 47 of the combustion chamber.

According to the invention, at least one groove 53 tapering upwardly into a point is provided in the projection of the piston which groove is so shaped that it imparts in turn a rotational movement of flow in the direction of the arrows 22 to the portion of the charge and exhaust gases that are displaced by the portion 52 of the piston. By means of this construction, at the end of the compression stroke, that is, shortly before the beginning of the fuel injection operation or the combustion respectively, the rotational movement of flow taking place in the cylinder is accelerated whereby the distribution of the fuel is improved. But also the accelerated rotational movement of flow setting in during the end portion of the exhaust stroke assists in completing the emptying of the cylinder and facilitates the initiation of the admission operation.

In Fig. 9, the portion 54 of the outlet valve 7 projecting into the combustion chamber is shown to be so shaped as to facilitate the gases passing out, flowing towards the seat 55 of the outlet valve axially of the cylinder. This is accomplished by giving the end of this projecting portion of the valve body carrying the valve seat a ——-shaped. For preventing the valve 7 becoming too heavy the thus shaped projecting portion may be hollowed out on the inner side. Furthermore, helical guide members 57 may be inserted in the exhaust passage for imparting in turn a rotational movement of flow to the discharged exhaust gases, in the direction of the arrow 22, thereby facilitating the gases passing out of the port and over to the exhaust socket 59.

Fig. 11 shows a complete vertical section through a working cylinder, inclusive of the crank drive, the combustion chamber being constructed in a manner similar as shown in the Figs. 9 and 10. Also in this case two cam shafts 23 and 27 are provided which carry the outlet cam 24 and the inlet cams 28 respectively. The inlet valves are controlled by the latter cams through the intermediary of linkages 28'. The control of the outlet valve 7 is effected througn the intermediary of the linkage 25 by the tappet 9.

Alternatively, as shown in the Figs. 9 and 12, the exhaust casing 59 may be flared outwardly in the manner of a megaphone in order to transform some part of the high velocity at which the exhaust gases are discharged back into pressure. This is of particular advantage for internal combustion engines in which the exhaust gases, after leaving the cylinders, are utilized, for example, for driving exhaust gas turbines. With a view to impeding the rotational movement of flow as little as possible by the presence of the spindle of the valve 7 which passes through the valve casing 58, the casing may be in the form of a spiral passage surrounding the valve spindle.

By virtue of the construction shown in the Figs. 9 and 10, during all strokes of the piston, a rotational movement of flow in the same direction is imparted to the contents of the cylinder. This rotational movement begins during the admission stroke and lasts for the whole duration thereof. At the end of the next following compression stroke an additional rotational driving impulse is effected by the piston 3 provided with the projection 51 shortly before the combustion sets in. At the end of the expansion stroke the exhaust operation begins during which the rotational movement of flow sets in exteriorly beyond the outlet valve, but may, in certain circumstances, continue through the interior of the cylinder by effect of the great velocity of discharge.

In engines that are scavenged, the inlet valves 6 and 6' open before the outlet valves 7 have closed. During this scavening period the rotational movement of flow is accelerated by the effect of the inflowing charge. While flowing in the entering charge takes a decidedly downward course. This course is only changed over again to an axial course in the direction towards the outlet member 7, after the charge has impinged on the end 50 of the piston to be deflected thereby. During the combustion and the expansion period, due to the inlet and outlet valves being closed, a rotational movement of flow about the cylinder axis takes place and at the same time a spiral movement peripherally of a vertical cylinder from above to below, whereupon the movement continues upwardly through the interior of this vertical cylinder and then spreads outwardly again. The fuel which, for example, is injected from outside towards the centre of the piston is thus distributed in all directions.

From Fig. 13 it is evident how the movement of flow of air and gas respectively takes place during the scavenging period. To this end the inlet members 6 and the outlet member 7 are open. Away from the inlet valves 6 the charging and scavening air impinges on the outer end of the piston in such a way that the moving mass follows a rotational course about the cylinder axis. Above the central portion of the piston the scavenging air then rises up in a number of convolutions of the same direction of rotation, whereupon it pushes the exhaust gases past the valve disc of the exhaust valve 7 into the exhaust casing behind the valve 7.

In Fig. 14 a variant construction of the combustion chamber is shown in which at least the upper portion of the exhaust chamber is spherical, thereby providing for a minimum of superficial area.

Another advantage of the invention resides in the fact that the cool charge contacts at first only with the exterior wall surfaces of the combustion chamber and of the combustion cylinder and that only the heated gases rise upwardly through a central zone thereof.

The combustion cylinders may be vertically disposed, as shown in the drawings, or else any other relative arrangement may be used, such as opposed, V-shaped, or radial cylinder arrangements.

As automatic inlet members not only valves of the type shown in the drawings may be used, but in fact any other suitable type, as disc or ring valves. The inlet and outlet valves may be mechanically operable, as shown in some figures of the drawings, or else pneumatically or hydraulically operated valves may be used.

What I claim is:

1. In a four-cycle internal combustion engine, a working cylinder having a reciprocable piston therein, a longitudinally projecting middle portion on said piston comprising diverting surfaces, a cylinder head structure having walls forming a substantially round combustion chamber of a smaller diameter than that of said cylinder situated at the upper end of the cylinder and in the prolongation of the cylinder axis, a plurality of air inlet valves arranged in the peripheral side wall of said combustion chamber, peripherally and downwardly directed guiding means in the cylinder head structure cooperating with said air inlet valves for imparting to the charge entering through said valves a rotational movement of flow circumferentially of said chamber and in a direction towards said piston, and an exhaust means disposed in the end wall of said combustion chamber remote from said piston, the diverting surfaces of the longitudinally projecting portion of the piston diverting said rotational movement of flow into a direction towards said exhaust means through the interior portion of said chamber.

2. In a four-cycle internal combustion engine, a working cylinder having a reciprocable piston therein, a central diverting surface on said piston, a cylinder head having walls forming a substantially round combustion chamber of a smaller diameter than that of said cylinder at the upper end of the cylinder and in the prolongation of the cylinder axis, a plurality of air inlet valves arranged in the peripheral side wall of said combustion chamber, guiding means in the cylinder head structure cooperating with said air inlet valves for imparting to the charge entering through said valves a rotational movement of flow circumferentially of said chamber and in a direction towards said piston, and an exhaust means dispostd in the upper end wall of said combustion chamber remote from said piston and a deflecting surface provided on the underside of said exhaust means facing said combustion chamber, the diverting surface on the piston diverting said rotational movement of flow into a direction towards said exhaust means through the interior portion of said chamber and said deflecting surfaces on said exhaust means spreading it out laterally towards the free passage of said exhaust means.

3. In a four-cycle internal combustion engine, a working cylinder having a reciprocable piston therein, a central diverting surface on said piston, a cylinder head structure having walls forming a substantially round combustion chamber of a smaller diameter than that of said cylinder at the upper end of the cylinder and in prolongation of the cylinder axis, a plurality of air inlet valves arranged in the peripheral side wall of said combustion chamber, guiding means in the cylinder head structure cooperating with said air inlet valves for imparting to the charge entering through said valves a rotational movement of flow circumferentially of said chamber and in a direction towards said piston, and an exhaust means disposed in the end wall of said combustion chamber remote from said piston, the diverting surface on the piston element diverting said rotational movement of flow in a direction towards said exhaust means through the interior portion of said chamber, and an exhaust conduit connected to said chamber and surrounding said exhaust means coaxially, said exhaust conduit being conically flared outwardly.

4. In a four-cycle internal combustion engine, a working cylinder having a reciprocable piston therein, a central diverting surface on said piston, a cylinder head structure having walls forming a substantially round combustion chamber of a smaller diameter than that of said cylinder at the upper end of the cylinder and in the prolongation of the cylinder axis, a plurality of air inlet valves arranged in the side wall of said combustion chamber, some of said inlet valves being eccentrically disposed relative to the axis of said combustion chamber, said combustion chamber having set back portions cooperating with said eccentrically disposed inlet valves, guiding means in the cylinder head structure, cooperating with said air inlet valves for imparting to the charge entering through said valves, a rotational movement of flow circumferentially of said chamber and in a direction towards said piston, and an exhaust means disposed in the top end wall of said combustion chamber remote from said piston, the outer diverting surface on the piston element diverting said rotational movement of flow in a direction towards said exhaust means through the interior portion of said chamber.

5. In a four stroke cycle internal combustion engine, a cylinder, a reciprocating piston in said cylinder, a projection on the upper end of said piston having an inclined surface, a substantially round combustion chamber of a smaller diameter than the cylinder bore surrounding with its side wall the upper prolongation of the cylinder axis and cooperating with said projection when the piston is in the vicinity of its upper dead center position, an upper wall surface on said combustion chamber provided with an exhaust valve, said side wall having a plurality of intake ports arranged circumferentially thereof and opening at the periphery thereof, inlet valves controlling said openings, guide surfaces leading to said ports on the outside of the limit of said combustion chamber and having portions tangential to said side wall for passing the entering charge therearound downwardly onto said inclined surface of said cooperating projection for directing the flow inwardly to the central part of said projection, there being diverted by the latter upwardly in the vicinity of the axis of said combustion chamber and along the undersides of said exhaust valve to said exhaust port.

6. In a four stroke cycle internal combustion engine, a cylinder, a reciprocating piston in said cylinder, a flow diverting projection on the upper end of said piston, a substantially round combustion chamber of a smaller diameter than the cylinder surrounding with its side wall the upper prolongation of the cylinder axis and cooperating with said projection when the piston is in the vicinity of its upper dead center, an upper wall surface on said combustion chamber provided with an exhaust port, an exhaust valve controlling said port, said valve having a V-shaped underside, said side wall having a plurality of intake ports arranged circumferentially thereof and opening at the periphery thereof, inlet valves controlling said openings, guide surfaces leading to said ports on the outside of the limit of said combustion chamber and having portions extending tangential to said side wall for passing the entering charge therearound downwardly onto said cooperating projection for directing the flow inwardly to the central part of said projection, there being diverted by the latter upwardly in the vicinity of the axis of said combustion chamber and along said V-shaped underside of said exhaust valve, so that the eddy forming in the upper extension of the cylinder axis and moving from said piston is expanded toward the periphery of said exhaust valve prior to arriving at said exhaust port.

7. In a four stroke cycle internal combustion engine, a cylinder, a reciprocating piston in said cylinder, a flow diverting projection on the upper end of said piston, a substantially round combustion chamber of a smaller diameter than the cylinder surrounding with its side wall the upper prolongation of the cylinder axis and cooperating with said projection when said piston is in the vicinity of its upper dead center, an upper wall surface on said combustion chamber provided with an exhaust port, an exhaust valve controlling said port, said side wall having a plurality of intake ports arranged circumferentially thereof and opening at the periphery thereof, inlet valves controlling said intake ports, guide surfaces leading to said ports on the outside of the limit of said combustion chamber and having portions extending tangential to said side wall for passing the entering charge therearound downwardly onto said cooperating projection for directing the flow inwardly to the central part of said projection, the charge there being diverted by said projection upwardly into the vicinity of the axis of said combustion chamber and along the underside of said exhaust valve to said exhaust port, some of the intake valves being disposed eccentrically to the axis of the cylinder and combustion chamber, and the combustion chamber being enlarged toward the piston.

8. In a four stroke cycle internal combustion engine, a cylinder, a reciprocating piston in said cylinder, a flow diverting projection on the upper end of said piston, a substantially cylindrical combustion chamber of a smaller diameter than the cylinder surrounding with its side wall the upper prolongation of the cylinder axis and cooperating with said projection when said piston is in the vicinity of its upper dead center, an upper wall surface on said combustion chamber, said upper wall being provided with an exhaust port, a valve controlling said exhaust port, the side wall of said combustion chamber having a plurality of inlet ports formed therein and arranged circumferentially of said side wall and opening at the peripehery thereof, inlet valves controlling said inlet ports, guide surfaces leading to said inlet ports on the outside of the limit of said combustion chamber and having portions extending tangentially to said side wall for passing the entering charge therearound downwardly onto said cooperating projection of the piston for directing the flow of the charge inwardly to the central part of said projection, there the charge being diverted by the projection upwardly into the vicinity of the axis of said combustion chamber and along the underside of said exhaust valve to said exhaust port.

9. In a four-stroke-cycle, compression-ignition type internal combustion engine, a working cylinder having a reciprocable piston therein, the central portion of the upper surface of said piston serving as a flow diverting surface for the air charge, walls forming a substantially round combustion chamber having a considerably smaller diameter than that of said cylinder situated at the upper end of the cylinder and having its axis in prolongation of the cylinder axis, fuel injection means opening into said combustion chamber, the upper wall of said chamber having an exhaust port, a valve controlling said exhaust port, the side walls of said combustion chamber having a plurality of air inlet ports therein substantially uniformly spaced apart, around the entire circumference of the combustion chamber, valves for controlling said air inlet ports, the uniform circumferential spacing of said inlet ports serving to produce a substantially uniform distribution around the perpihery of said combustion chamber of the air entering through said inlet ports, air conduits leading to said inlet ports, said conduits having guiding surfaces directed tangentially of the combustion chamber and downwardly toward the piston for imparting to the air entering through said air inlet ports a movement directed circumferentially of said chamber and downwardly against the diverting surface of said piston, the downward component of movement being diverted centrally by contact with the diverting surface of the piston, substantially uniformly from all directions so as to impinge upon itself uniformly from opposite directions toward the center of the combustion chamber and thereby be diverted in an axial direction toward the exhaust valve, within the downwardly moving helical flow of the incoming air, the axial component of flow producing jointly with the rotational component of flow a combined swirling action in horizontal and vertical planes which reaches all parts of the combustion chamber and brings the incoming air into contact with all interior surfaces of the combustion chamber symmetrically and also the flow diverting surface of the piston so as to uniformly cool said surfaces.

ALFRED BÜCHI.